June 17, 1924.
G. J. STEINHAUSER
TRACTION DEVICE FOR TIRES
Filed June 30, 1922
1,497,744
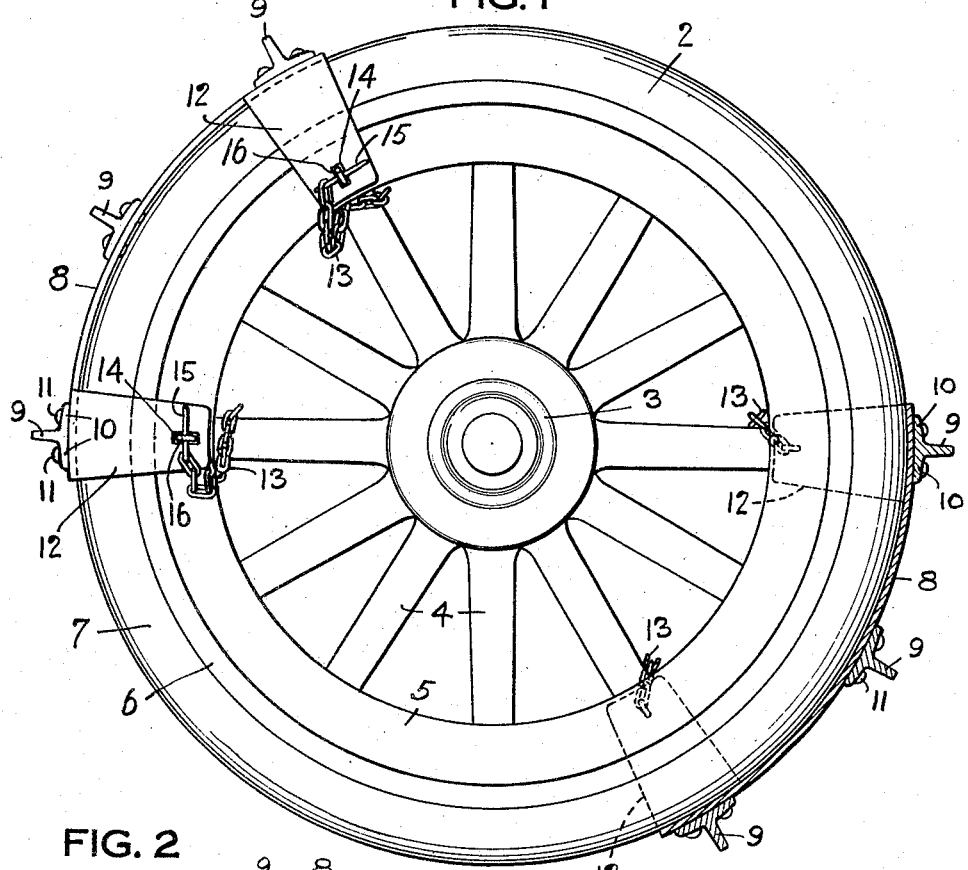
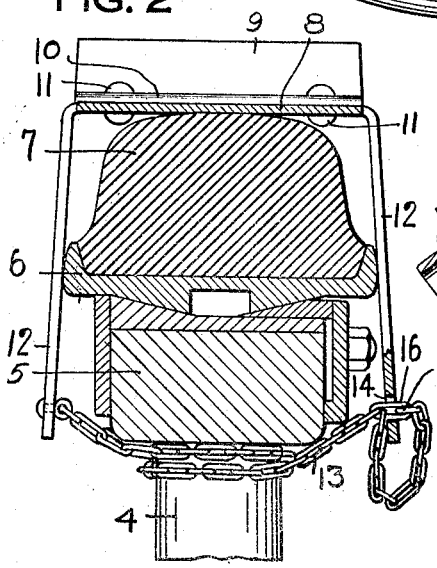
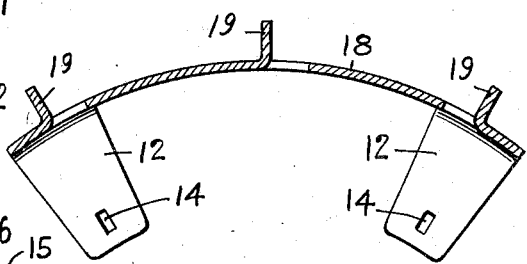
INVENTOR
George J. Steinhauser Patented June 17, 1924.

1,497,744

UNITED STATES PATENT OFFICE.

GEORGE J. STEINHAUSER, OF CARRICK, PENNSYLVANIA.

TRACTION DEVICE FOR TIRES.

Application filed June 30, 1922. Serial No. 571,872.

*To all whom it may concern:*

Be it known that I, GEORGE J. STEIN-HAUSER, a citizen of the United States, and resident of Carrick, in the county of Allegheny and State of Pennsylvania, have invented a new and useful Improvement in Traction Devices for Tires; and I do hereby declare the following to be a full, clear, and exact description thereof.

My invention relates to improvements in detachable emergency traction shoes for automobiles or other vehicle tires, the object of my invention being to provide a traction-shoe of this character which is strong and durable, and which may be readily applied to and removed from a vehicle, and which when in use will prevent an automobile from being stalled in a muddy road, thereby causing great inconvenience and delay, especially in the case of trucks, where heavy hauling is being done.

In the accompanying drawing, Fig. 1 is a face view of a suitable wheel, showing my invention applied thereto; Fig. 2 is an enlarged cross section of the rim of the wheel showing my traction shoe applied thereto; and Fig. 3 shows a modified form of my invention.

In the drawing the numeral 2 designates a suitable wheel with the hub 3, the spokes 4, the felly 5, and the rim 6 with the tire 7 suitably held in said rim. As my invention, however, is applicable to any form of a tire, it is not necessary to refer further in detail to this part of the construction.

My improved shoe consists of a plate 8 of steel or other suitable metal of proper thickness, said plate being bent on the arc of a circle to conform to the tire 7. Riveted or otherwise secured to the plate 8 are the traction-lugs 9 which may be formed of hardened steel with the flanges 10 through which the rivets 11 pass which connect the said traction-lugs to the plate 8.

The length of the shoe may vary, as desired, and the number of traction-lugs or their distance apart may be varied according to the work required and the diameter of the wheel on which they are to be used.

The plate 8 has the inwardly projecting lugs 12 at each end thereof, said lugs being preferably formed integral with the plate 8, said lugs projecting inwardly at substantially the point where the spokes 4 enter the felly 5.

A chain 13 is connected to the inside lug 12 in any suitable manner, and said chain is of such a length as to permit its being wound around the spoke 4 adjacent to the lugs 12, whereupon one of the links of said chain is passed through the opening 14 formed in the outside lug 12. A suitable instrument of any kind may be inserted in the link so passed through the opening 14 so as to draw the chain up taut, whereupon the hook or key 15 at the outer end of the chain 13 is passed through the link 16. In order to hold the hook securely in place in the link 16, the hook or key is wedge-shaped and is forced or driven through the outer end of the link 16. In this manner the shoe is rigidly secured in place on the tire, and when once secured in this manner it will be held against accidental displacement, and when the wheel is driven into the mud the lugs 9 will give the required traction to drive the automobile through the mud without stalling.

My improved shoe is one which can be readily attached to the wheel without any great labor or exertion, and when once applied will act in a very effective manner to drive the automobile out of the mud or mire in which it is stalled.

In Fig. 3 I have illustrated a slightly modified form of my invention in which the plate 18 has the mud lugs 19 struck up therefrom, so that said lugs are integral with the said plate.

What I claim is:

1. A traction shoe for vehicle wheels comprising a curved metal plate, mud-lugs on said plate, two pairs of inwardly projecting lugs on said plate, each pair being adjacent to a spoke of the wheel, a chain connected to one lug of each pair of inwardly extending lugs adapted to be wrapped around the adjacent spoke, an opening formed in the other projecting lug of each pair adapted to receive one of the links of said chain, and a key engaging said link of each chain.

2. A traction shoe for vehicle wheels comprising a curved metal plate, mud lugs on said plate, a pair of inwardly projecting lugs at each end of said plate, a flexible member connected to one of the lugs of each pair of said inwardly projecting lugs adapted to be wrapped around a spoke of the wheel, and means for connecting said flexible member to the other lug of each pair of projecting lugs.

In testimony whereof I, the said GEORGE J. STEINHAUSER, have hereunto set my hand.

GEORGE J. STEINHAUSER.